United States Patent
Okamoto et al.

(10) Patent No.: US 8,114,450 B2
(45) Date of Patent: Feb. 14, 2012

(54) METHOD OF IMPROVING PROPERTIES OF STARCH-CONTAINING FOOD AND PROPERTY-IMPROVING AGENT

(75) Inventors: Takeshi Okamoto, Kawasaki (JP); Hidehiko Wakabayashi, Kawasaki (JP); Noriki Nio, Kawasaki (JP); Hikaru Shibata, Kawasaki (JP); Toshiya Numazawa, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 614 days.

(21) Appl. No.: 11/542,127

(22) Filed: Oct. 4, 2006

(65) Prior Publication Data

US 2007/0110847 A1 May 17, 2007

Related U.S. Application Data

(63) Continuation of application No. PCT/JP2005/006839, filed on Mar. 31, 2005.

(30) Foreign Application Priority Data

Apr. 5, 2004 (JP) .................. 2004-110859
Apr. 21, 2004 (JP) .................. 2004-125861

(51) Int. Cl.
*A23L 1/10* (2006.01)

(52) U.S. Cl. ..................... 426/28

(58) Field of Classification Search ............. 426/18, 426/28
See application file for complete search history.

(56) References Cited

U.S. PATENT DOCUMENTS

| 4,454,161 | A | * | 6/1984 | Okada et al. .................. 426/48 |
| 6,436,462 | B1 | * | 8/2002 | Takami et al. ............... 426/618 |
| 6,685,974 | B2 | | 2/2004 | Whalen |
| RE38,507 | E | * | 4/2004 | Olesen ........................ 426/20 |
| 6,861,519 | B2 | | 3/2005 | Backer et al. |
| 7,015,318 | B2 | | 3/2006 | Fuertes et al. |
| 7,638,151 | B2 | * | 12/2009 | Duan et al. ................... 426/20 |
| 2002/0004085 | A1 | * | 1/2002 | Xu et al. ..................... 426/52 |
| 2003/0109010 | A1 | * | 6/2003 | Fuertes et al. .............. 435/101 |
| 2003/0194762 | A1 | | 10/2003 | Kubota et al. |
| 2005/0031734 | A1 | * | 2/2005 | Duan et al. ................... 426/20 |
| 2010/0055752 | A1 | | 3/2010 | Kumar |

FOREIGN PATENT DOCUMENTS

| EP | 1 445 325 | 8/2004 |
| JP | 54-157897 | 12/1979 |
| JP | 59-002664 | 1/1984 |
| JP | 60-199355 | 10/1985 |

(Continued)

OTHER PUBLICATIONS van der Maarel, Mjec et al., Properties and applications of starch-converting enzymes of the α-amylase family, J. of Biotech, 94 (2002), 137-155).*

(Continued)

*Primary Examiner* — Chhaya Sayala
*Assistant Examiner* — Jerry W. Anderson
(74) *Attorney, Agent, or Firm* — Oblon, Spivak, McClelland, Maier & Neustadt, L.L.P.

(57) ABSTRACT

A method of improving the quality of a starch-containing food and a method of suppressing the retrogradation of a starch-containing food by adding an enzyme having a glycosyl transfer activity, whereby an α-1,4 bond is converted into an α-1,6 bond, to the starch-containing food; and a quality improving agent for a starch-containing food which contains the enzyme.

21 Claims, 6 Drawing Sheets

FOREIGN PATENT DOCUMENTS

| | | |
|---|---|---|
| JP | 07-322811 | 12/1995 |
| JP | 08-140600 | 6/1996 |
| JP | 09-322770 | 12/1997 |
| JP | 2004-024213 | 1/2004 |

OTHER PUBLICATIONS

Nakajima, "Bunki Oligosaccharide ni Tsuite", Denpun, Aug. 21, 1992, No. 37, pp. 36-42. (w/English translation).

Shima, "Bio Products α-Glucosidase", Bio Industry, Mar. 12, 1997, vol. 14, No. 3, p. 55. (w/English translation).

U.S. Appl. No. 13/035,128, filed Feb. 25, 2011, Yamada, et al.

T. Kobayashi et al., *Agr. Biol. Chem.*, vol. 27, No. 6, pp. 438-444 (1963).

A. Nakamura et al., *J. Biotechnology*, vol. 53, pp. 75-84 (1997).

L. Zhang et al., *Biochemical Engineering Journal*, vol. 46, pp. 186-192 (2009).

http://www.amano-enzyme.co.jp/pdf/food_e/cat_food TGL-3 e.pdf (2010).

http://www.chem.qmul.ac.uk/iubmb/enzyme/EC3/2/1/20.html, 1982.

http://www.rtvanderbilt.com/VANZYME04.pdf "VANZYME Starch Liquefier", 2009.

http://www.agfdt.de/loads/st07/gangabb.pdt "A New Acid Stable Thermostable Maltogenic Alpha Amylase for High Maltose Syrup", Jan. 3, 2011.

http://www.enzymesolutions.com.au/catalogue/4453/grain-processing.html "Grain Processing", 2011.

"EC 3.2.1.133", IUBMB Enzyme Nomenclature, 1999.

U.S. Appl. No. 13/180,587, filed Jul. 12, 2011, Yamada.

* cited by examiner

Potato (cut into dices each being 2 × 2 × 2 cm)
↓
Enzymatic Reaction   Enzyme solution in the same amount of potato was added thereto and potato was soaked therein
↓
Steaming   for 3 minutes
↓
7% NaCl solution was added thereto
↓                    ↓
Step A               Step B
↓        Cooling (quickly cooled in refrigerator
↓             down to room temperature)
↓                    ↓
Mixing (mayonnaise was added thereto)
Dressed so as to remain the shape of mash (A) or potato Condition for Enzymatic Reaction

| Temperature (°C) | 40 |
|---|---|
| Time (hours) | 2 |
| TGL Concentrations (%) | 0, 0.5 and 2.5 |

FIG. 5

METHOD OF IMPROVING PROPERTIES OF STARCH-CONTAINING FOOD AND PROPERTY-IMPROVING AGENT

CROSS REFERENCES TO RELATED APPLICATIONS

This application is a continuation of International Patent Application No. PCT/JP05/006839, filed on Mar. 31, 2005, and claims priority to Japanese Patent Application No. 110859/2004, filed on Apr. 5, 2004, and Japanese Patent Application No. 125861/2004, filed on Apr. 21, 2004, all of which are incorporated herein by reference in their entireties.

BACKGROUND OF THE INVENTION

1. Field of Invention

The present invention relates to methods for improving the quality of a starch-containing food with an enzyme having a glycosyl transfer activity which transfers an α-1,4 bond to an α-1,6- bond. The present invention relates to methods for suppressing the retrogradation a starch-containing food with the enzyme. The present invention further relates to an agent for improving the quality of a starch-containing food, in which the agent contains the enzyme.

2. Discussion of the Background

When gelatinized starch is allowed to stand at ambient temperature or low temperature, it separates out water therefrom and becomes hard. This phenomenon is called retrogradation and many studies have been conducted for the retrogradation of starch. In order to suppress the retrogradation, it is usually necessary to maintain the temperature of the starch at 80° C. or higher, to dry quickly the starch so as to make the water content 15% or less, and to keep the starch alkalinized at pH 13 or higher, etc. There also has been known a method where saccharides (such as glucose, fructose and liquid sugar), soybean proteins, wheat gluten, fatty acid esters, polysaccharides (such as that from yam, konjak, etc.) thickeners, surfactants, enzymes, etc. are added to a starch-containing food, whereby the retrogradation is suppressed.

With regard to methods of utilizing enzymes, there has been disclosed a method of improvement of cooked rice where polished rice is mixed with enzymes such as amylase, protease and lipase, salt and cyclodextrin followed by boiling (see, Japanese Patent Laid-Open No. 58-86050); a method for the suppression of retrogradation of cooked rice where an aqueous solution of a saccharified type amylase (β-amylase, glucoamylase) is sprayed onto rice after cooking (see, Japanese Patent Laid-Open No. 60-199355); a composition for improvement of cooked rice containing cyclodextrin, one or more members of amylolytic enzymes, proteinases and cellulases, emulsifiers and water-soluble gelatin (see, Japanese Patent Laid-Open No. 59-2664); an additive for rice grains containing a combination of lecithin and an enzyme which decomposes albumen cell wall (cellulase) (see, Japanese Patent Laid-Open No. 02-72836); and an additive for rice grains using an endopeptidase (see, Japanese Patent Laid-Open No. 03-180151). The above-mentioned methods attempt to improve the quality of cooked rice by the addition of various enzyme preparations, but none of them achieves a remarkable effect.

With regard to cooked rice, it is the current status that, when rice of low quality (such as old rice, rice stored for two years and lowly palatable rice) is used, no satisfactory quality is achieved in terms of taste, texture, flavor, etc. even immediately after cooking. Further, even in the case of highly palatable rice and new rice, their commercial values (taste, texture, flavor, etc.) lower due to deterioration of the quality, such as retrogradation of starch with the passage of time, although the degree is different depending upon their storing conditions (storage in a rice cooker, room temperature, cold storage, freezing). Especially in the catering business of boxed lunches for taking out or the food service industry, rice cooked at a shop is sometimes kept warm for about 2 hours in a rice cooker, and there has been a demand for the suppression of of the deterioration of the quality of the cooked rice. Many methods have been investigated for improvement of the quality of rice upon cooking and for the suppression of deterioration upon storing.

For example, there has been disclosed a quality improving agent for cooked rice using trehalose (see, Japanese Patent Laid-Open Nos. 2003-12571 and 2003-225059). With regard to an improving method using enzymes, there has been disclosed an improving agent for quality of cooked rice using trehalose and amylase (see, Japanese Patent Laid-Open No. 10-234320); a method where rice is cooked together with protease, β-amylase and starch (see, Japanese Patent Laid-Open No. 07-274865); an improving agent for cooked rice where a pH adjusting agent and an adhesive derived from cereal are contained in amylolytic enzymes (α-amylase, β-amylase, glucoamylase), and an enzyme which decomposes the cell wall of rice grain (cellulase) (see, Japanese Patent Laid-Open No. 08-140600); an improving agent containing amylolytic enzymes (α-amylase, β-amylase, glucoamylase, etc.), proteinase (papain) and processed starch (see, Japanese Patent Laid-Open No. 07-031396). However, even in methods where various enzyme preparations are combined with saccharide or pH adjusting agent, it is the current status that a sufficient improving effect for the quality in terms of taste, texture, flavor, etc., such as a suppressive effect for the deterioration of the quality of a cooked rice product, which is kept warm for 2 hours in a rice cooker, has not been achieved.

With regard to bread, when time passes after baking, an inner part of the bread becomes hard and dry in texture. This change in the bread is referred to as retrogradation of bread. In a bakery product, such as a sandwich which has been markedly consumed in recent years, there are many cases where ingredients for refrigeration are used and, therefore, distribution by refrigeration and storage by refrigeration are becoming a mainstream. Usually, retrogradation of bread occurs under a refrigerated state, in which various methods have been investigated for suppressing the retrogradation.

For example, methods have been investigated to modify the formulations by adding an emulsifier or an enzyme, such as amylase, or by increasing the amounts of sugar, fat/oil or water in manufacturing bread. However, although there are methods where an emulsifier is solely added, there is also generally disclosed a method where an emulsifier is combined with an enzyme (see, Japanese Patent Laid-Open No. 05-168394); and a method where an emulsifier and protein are dispersed and compounded in fat/oil (see, Japanese Patent Laid-Open No. 08-26621), etc. However, although an effect for softness is achieved by those methods, a bad effect on texture caused by the emulsifier (such as where the product sticks to teeth, becomes glutinous or becomes a dumpling-like lump in the mouth) creates an unfavorable texture. In addition, although the prevention of retrogradation due to the enzyme preparations has been investigated in recent years, there is a weak effect for the prevention of retrogradation in the case of carbohydrase, such α-amylase, β-amylase and glucoamylase, whereby, when stored in a refrigerator, no sufficient effect is achieved. In the case of a proteinase, such as protease and papain, although an effect is available in terms of softness of the bread, the dough in the manufacture of bread becomes sticky causing problems that the process efficiency lowers or the sufficient volume of bread is not obtained.

In order to simplify the process of the manufacture of bread, frozen dough has been widely used in recent years. However, the thawed dough becomes soft due to growth of ice crystals, production of carbon dioxide, etc. during freezing storage and, further, the generation of gas lowers due to the death of yeast. Therefore, when bread is manufactured using such dough, problems such as a decrease in volume and a promotion of retrogradation occur.

As a method for improving the disadvantage caused by freezing and thawing of the dough, an emulsifier such as monoglyceride has been used. However, in the bread where the above-mentioned emulsifier is used, there are problems such as bad flavor due to the unique undesirable taste and smell, and that the texture is sticky. With regard to an improving agent using no emulsifier, there has been a proposal where an improving agent containing a maltotriose productive enzyme or hemicellulase is used for frozen dough (see, Japanese Patent Laid-Open No. 07-322811). In this method, however, there is a problem that the baked bread lacks in softness. There is also a proposal for a dough improving agent where hemicellulase and amylase are mixed with a fat/oil composition for increasing the dispersing property (see, Japanese Patent Laid-Open No. 2000-83573), but the effect is not so clear and, at present, it is not relate to any significant improvement in the quality of the dough.

With regard to noodles, it is noted that noodles are generally prepared by cooking raw noodles. Raw noodles are prepared in such a manner that an auxiliary material such as starch is added, if necessary, to powder such as wheat flour (strong flour, semi-strong flour, medium strength flour, soft flour and durum semolina flour), adlay flour, barley flour, rye flour, buckwheat flour, rice flour, corn flour or soybean flour, then mixed after addition of water together, if necessary, with salt, kansui(alkaline solution) or alcohol and spread, and the resulting noodle belt is cut into a predetermined shape. Noodles which are processed by freezing, frying, drying and pre-boiling the raw noodles prepared as such are also manufactured and distributed. Generally, the palatability of noodles is greatly dependent upon the physical property and texture. It has been demanded that those noodles have adequate hardness, elasticity, toughness and smoothness (slippery feel) after being cooked, have good texture with a good slippery smoothness through the throat and are hardly softened with hot water or by boiling. In order to manufacture the noodles as such, various attempts have been made, such as selecting suitable ingredients, the development of formulations, the improvement of manufacturing steps, the development of noodle manufacturing machines (see, Japanese Patent Laid-Open No. 05-316978), and an addition of food additives such as phosphates, emulsifiers or thickening polysaccharides or food materials such as egg white and gluten (see, Japanese Patent Laid-Open Nos. 54-76846 and 07-107934). However, the above-mentioned methods and additions are not sufficient, and there still has been a demand for a property improving agent by which the texture is able to be further improved.

With regard to an enzyme having a saccharide transferring activity which converts an $\alpha$-1,4-bond to an $\alpha$-1,6-bond, there may be listed transglucosidase and 1,4-$\alpha$-glucan branching enzyme, etc., and there are disclosures for a method for the manufacture of seishu (sake or Japanese rice wine) using transglucosidase (see, Japanese Patent Laid-Open No. 54-157897); a method for the manufacture or mirin (sweetened sake) (see, Japanese Patent Laid-Open No. 01-171472); and a method for the manufacture of a cyclic glucan using a 1,4-$\alpha$-glucan branching enzyme (see, Japanese Patent Laid-Open No. 08-134104). However, none of the above-mentioned mentioned methods relates to the suppression of retrogradation and an improvement of the quality of a starch-containing food, such as a cooked rice food and a processed wheat food.

In view of the foregoing, there remains a need for a method of improving the quality of a starch-containing food, and an agent for improving the quality of a starch-containing food, such that the degradation of the starch-containing food is suppressed and the quality of thereof can be maintained for long periods of time.

SUMMARY OF THE INVENTION

Accordingly, it is an object of the present invention to provide a novel method for improving the quality of a starch-containing food.

It is another object of the invention to provide a novel method for suppressing the retrogradation of a starch-containing food.

It is another object of the present invention to provide a quality improving agent for a starch-containing food.

It is another object of the present invention to provide a novel method for improving the quality of a cooked rice food.

It is another object of the present invention to provide a novel method for improving the quality of bread.

It is another object of the present invention to provide a novel method for improving the quality of noodles.

It is another object of the present invention to provide a novel method for improving the quality of potato salad.

It is another object of the present invention to provide a novel method for improving the quality of starch.

These and other objects, which will become apparent during the following detailed description, have been achieved by the inventors' discovery that when an enzyme having a saccharide transfer activity which converts an $\alpha$-1,4-bond to an $\alpha$-1,6-bond is added to a starch-containing food, retrogradation of a starch-containing food is suppressed and the quality of the food is improved.

Accordingly, the present invention provides the following:

(1) A method for improving the quality of a starch-containing food, said method comprising:
adding an enzyme to a starch-containing food,
wherein the enzyme has a saccharide transfer activity of converting an $\alpha$-1,4-bond to an $\alpha$-1,6-bond.

(2) A method for suppressing the retrogradation of a starch-containing food, said method comprising:
adding an enzyme to a starch-containing food,
wherein the enzyme has a saccharide transfer activity of converting an $\alpha$-1,4-bond to an $\alpha$-1,6-bond.

(3) A quality improving agent for a starch-containing food, which comprises:
an enzyme having a saccharide transfer activity of converting an $\alpha$-1,4-bond to an $\alpha$-1,6-bond.

(4) A method for improving the quality of a cooked rice food, said method comprising:
adding to raw rice 15 to 30,000 U of transglucosidase per gram of the raw rice; and
heating the rice to form a cooked rice food.

(5) A method for improving the quality of a cooked rice food, said method comprising:
adding to raw rice 3 to 30,000 U of transglucosidase per gram of the raw rice and 0.00065 to 0.65 U of $\beta$-amylase per gram of the raw rice; and
heating the rice to form a cooked rice food.

(6) A method for improving the quality of bread, said method comprising:
adding to wheat flour 1.5 to 150,000 U of transglucosidase per gram of the wheat flour,
mixing the wheat flour in a mixture for bread;
and baking the mixture to form the bread.

(7) A method for improving the quality of noodles, said method comprising:
adding to a raw material flour 1.5 to 150,000 U of transglucosidase per gram of the raw material flour;
mixing the raw material flour in a mixture for noodles; and forming the noodles.

(8) A method for improving the quality of potato salad, said method comprising:
adding to at least one potato 1.5 to 150,000 U of transglucosidase per gram of the potato; and
adding the potato to a salad mixture.

BRIEF DESCRIPTION OF THE DRAWINGS

FIG. 5 shows the flow diagram of manufacturing potato salad (Example 9).

DETAILED DESCRIPTION OF THE PREFERRED EMBODIMENTS

Figure 1:
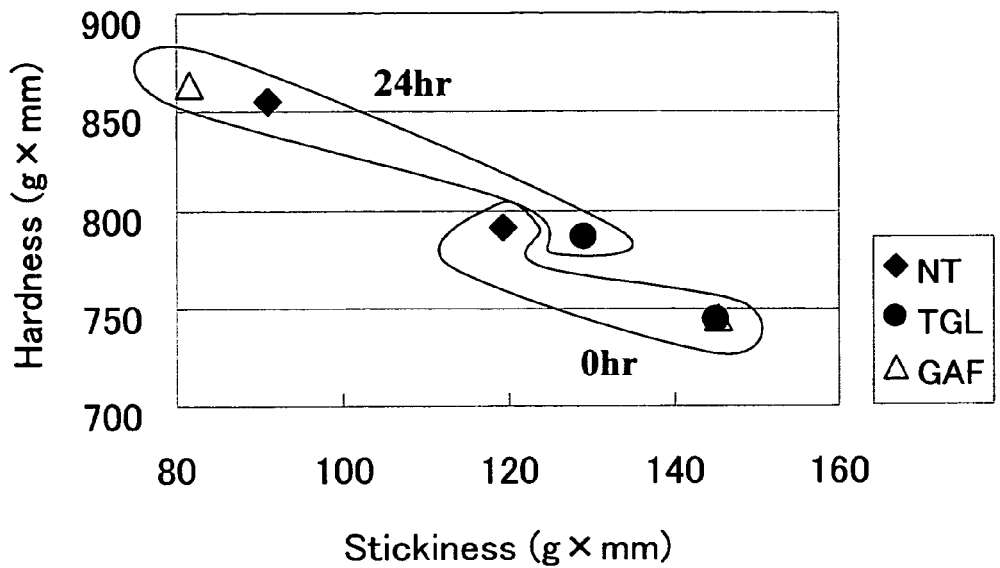
FIG. 1 shows the result of the TA measurement of the rice treated with TGL and GAF and of the untreated rice (Example 1).

In the methods for improving the quality of a starch-containing food and suppressing retrogradation in accordance with the present invention, an enzyme having a saccharide transfer activity where an α-1,4-bond is converted to an α-1,6-bond is used.

Examples of the enzyme having the activity are transglucosidase (EC 3.2.1.20), 1,4-α-glucan branching enzyme (EC 2.4.1.18) and 1,4-α-glucan 6-α-D-glucosyl transferase (EC 2.4.1.24). Transglucosidase may also be referred to a α-glucosidase or maltase, and is an enzyme having a saccharide transfer activity of converting an α-1,4-bond to an α-1,6-bond and hydrolyzing a non-reducing terminal α-1,4-glucoside bond to produce α-glucose. Incidentally, glucoamylase causes the reaction similar to α-glucosidase, but the resulting glucose is not α-glucose but β-glucose. Therefore, that does not correspond to the enzyme used in the present invention. Further, it is noted that the enzyme used in the present invention has not only a decomposing activity, but also a saccharide transfer activity where, when there is an appropriate receptor having hydroxyl group, glucose is transferred from an α-1,4-bond to an α-1,6-bond to produce a branched saccharide.

The enzyme which is contained in the conventional property improving agent is an enzyme which decomposes starch, and is not an enzyme which transfers the saccharide. Incidentally, an enzyme which is sold from Amano Enzyme Inc. under a trade name of Transglucosidase L "Amano" is an example of the enzyme having a saccharide transfer activity converting an α-1,4-bond to an α-1,6-bond.

With regard to the starch-containing food of the present invention, although there is no particular limitation so far as it is a food containing starch, examples thereof are foods in which starch contributes in the texture and physical properties of the foods. To be more specific, representative examples thereof are a cooked rice product, a processed wheat product such as bread and noodles, potatoes such as potato and sweet potato, other fruits and vegetables, starch per se thereof and processed starch which is treated with phosphoric acid or acetic acid. When starch contributes in the texture and physical properties of the food such as the case of sauce and liquid condiment where starch is added as a thickener, the starch-containing food of the present invention naturally includes such a liquid food. However, a liquid food having almost no viscosity such as sake, mirin and soy sauce where starch does not contributes in the texture and physical properties of the food is not included by the starch-containing food of the present invention. Further, a cyclic glucan is not included by the starch-containing food of the present invention.

The cooked rice food of the present invention includes cooked rice, red-colored cooked rice, pilaf, rice cooked with some ingredients, porridge, risotto, rice ball, sushi, box lunch and rice noodles. It also includes processed glutinous rice such as rice cake, ohagi (rice cake dumpling covered with bean jam) and dumpling. Their frozen products are also included by therein. The processed wheat product of the present invention includes noodles, such as udon (Japanese wheat noodles), Chinese noodles, buckwheat noodles and pasta; bread products such as plain bread, French bread, bun and cooked bread; and doughnut, cake, pancake, lasagna, macaroni, manju (bean-jam bun) and okonomiyaki (Japanese pancake). Their frozen products are also included therein. The processed potato products of the present invention include potato salad, fried potatoes, boiled potatoes, mashed potatoes, frozen products thereof and potato snacks such as potato chips.

When an enzyme having a saccharide transfer activity for converting an α-1,4-bond to an α-1,6-bond is allowed to act on rice, it may be added at any stage of a manufacture of cooked rice. Thus, the enzyme may be added to a soaking liquid at the stage when the rice absorbs water, the enzyme may be added after soaking and before cooking the rice or the enzyme may be added in the cooked rice (after cooking) by sprinkling the enzyme thereon. Further, the enzyme may be used together with other enzymes or substances. With regard to a rice material, any varieties of rice may be used and any of soft and hard rice or any of new rice, old rice and rice cropped two years ago will do. Any of low grade rice and high grade rice may be used. However, the suppressing effect for retrogradation which is one of the objects of the present invention is more significant in rice being not in so high grade and with poor taste generally.

With regard to the adding amount of the enzyme, it is appropriate within a range of not less than 15 U, preferably 15 to 30,000 U and, more preferably 300 to 30,000 U in terms of enzymatic activity per gram of the raw (uncooked)rice used as a material when no β-amylase is used together. Incidentally, with regard to the enzymatic activity, the amount of the enzyme producing 1 μg of glucose in 2.5 ml of the reaction solution when 1 ml of 0.02M acetate buffer (pH 5.0) is added to 1 ml of 1 mM α-methyl-D-glucoside and then 0.5 ml of the enzyme solution is added and made to act at 40° C. for 60 minutes is defined as 1 U.

There is no particular limitation for the reaction time of enzyme so far as it is the time by which the enzyme is able to act on a substrate and the reaction of either very short time or long time will do. As a practical reaction time however, it is preferred to be from 5 minutes to 24 hours. With regard to the reaction temperature, any temperature may be also acceptable so far as it is within a range that the enzyme keeps its activity and, as a practical temperature, it is preferred to act at a temperature between 4 and 70° C.

When β-amylase is used together with the above-mentioned enzyme, any β-amylase, such as commercially available β-amylase preparation, may be used. Although one derived from plants such as soybean, wheat and barley and one derived from various microbes may be included, one derived from plants is preferred. An example is the enzyme sold by Amano Enzyme Inc. under a trade name of "Biozyme ML".

When an enzyme having a saccharide transfer activity converting an α-1,4-bond to an α-1,6-bond is used together with β-amylase, far better effects in improvement of the quality (taste, texture and flavor) upon cooking and also in terms of prevention and suppression of deterioration of quality upon storage is able to be obtained in a fewer amount of the enzyme compared to when it is used solely. The reason is presumed to be that, as compared with the action of enzyme (enzyme having a saccharide transfer activity) on starch contained in raw rice grains, saccharide having short chain length being decomposed by amylase reacts with the enzyme (having a saccharide transfer activity), whereby the effect is bigger than that in case of the addition of the enzyme solely.

When β-amylase is additionally used, an object of improvement of the quality of cooked rice is able to be obtained when the adding amount of the enzyme having a saccharide transfer activity is not less than 3 U per gram of the raw rice used as a material although it is preferably 3 to 30,000 U and, more preferably 15 to 30,000 U. There is no limitation for the adding stage of the enzyme so far as the enzyme is present during the cooking of rice. Although the two kinds of enzymes, i.e., an enzyme having a saccharide transfer activity for converting an α-1,4-bond to an α-1,6-bond and β-amylase may be added at the same time or separately, it is preferred that the two enzymes are added at the same time in soaking the rice into water after washing the raw rice or immediately before cooking.

With regard to the reaction time, there is no particular limitation so far as the enzyme is able to act on the substrate. Any of very short time and long time will do. However, as a practical reaction time, it is preferred to be from 5 minutes to 24 hours. With regard to the reaction temperature, it is preferred to act within a range where the enzyme is able to keep its activity, i.e. from 4 to 80° C. With regard to the amount of adding water, there is no particular limitation. Usually, in case of cooked rice to be eaten, too much adding water (1.5-fold or more) results in very sticky cooked rice having bad palatability. However, when the enzyme is made to act thereon, stickiness of the cooked rice to which a higher amount of water is added is suppressed whereby the quality and palatability are improved.

In case of manufacturing bread by the reaction of the enzyme having a saccharide transfer activity converting an α-1,4-bond to an α-1,6-bond on wheat, the enzyme may be made to act at any stage of the bread manufacture although it is particularly preferred to add the enzyme at a mixing stage of the raw materials. It is also acceptable to make the enzyme act on a part of the materials. When the bread is manufactured by a sponge dough method, the enzyme may be made to act in any of a sponge dough stage and a main kneading stage. It is also acceptable to use the enzyme together with other enzymes or other substances. With regard to the material, any varieties of wheat will do and there is no problem even when the protein content is large or small. It is also able to be used for bread containing rice powder or other starch besides wheat. It is further able to be used for such a product where no wheat is contained at all and other starch is used as a substitute for wheat.

The adding amount of the enzyme per gram of the wheat flour or per gram of the powder such as starch substituting for wheat flour (total amount of their weights when two or more powders are used) is appropriately not less than 1.5 U, preferably within a range of 1.5 to 150,000 U, more preferably 10 U to 150,000 U and, still more preferably 100 to 150,000 U.

With regard to the reaction time and reaction temperature for the enzyme, there is no need to set a particular condition but a sufficient reaction is possible when the process is according to the common bread manufacturing processes although it is possible to take reaction time separately. Although the time may be very short or long, the practical reaction time is preferred to be from 1 minute to 24 hours. With regard to the reaction temperature, although any temperature will do so far as it is within a range where the enzyme is able to keep its activity, its practical temperature is preferred to be 4 to 80° C.

When an enzyme having a saccharide transfer activity for converting an α-1,4-bond to an α-1,6-bond is allowed to act on noodles, the enzyme may be allowed to act at any stage of the noodle manufacture although it is particularly effective to previously dissolve the enzyme in water or to add the enzyme in mixing the powder with water. In addition, the enzyme may be made to act on the whole of powder or on a part of the materials. It is also acceptable that the enzyme is used together with other enzymes or substances.

With regard to the material powder for noodles, representative powders are wheat flour (strong flour, semi-strong flour, medium strength flour, soft flour and durum semolina flour), rice flour, adlay flour, barley flour, rye flour, buckwheat flour, corn flour and soybean flour as well as the above to which various kinds of starch is added although any of such the material powders may be used. The adding amount of the enzyme per gram of the flour material of noodles (wheat flour or rice flour; their total weights when plural kinds of powders are used together) is appropriately not less than 1.5 U, preferably within a range of 1.5 to 150,000 U, more preferably 10 U to 150,000 U and, still more preferably, 100 to 150,000 U.

With regard to the reaction time and reaction temperature for the enzyme, there is no need to set a particular condition but a sufficient reaction is possible when the process is according to the common noodle manufacturing processes although it is possible to take the reaction time separately. Although the time may be very short or long, the practical reaction time is preferred to be from 1 minute to 24 hours. With regard to the reaction temperature, although any temperature will do so far as it is within a range where the enzyme is able to keep its activity, its practical temperature is preferred to be 4 to 80° C.

With regard to a method where potato, vegetable or starch is made to act with an enzyme having a saccharide transfer activity for converting an α-1,4-bond to an α-1,6-bond, there is no particular limitation so far as it is a method where the enzyme is able to be well introduced into the object. Examples thereof are methods where the enzyme is introduced by means of soaking, at high pressure or reduced pressure. With regard to the reaction time of the enzyme, it may be either very short time or long but the practical reaction time is preferred to be from 1 minute to 24 hours. With regard to the reaction temperature, any temperature will do so far as it is within a range where the enzyme keeps its activity but, as to the practical temperature, it is preferred to act at 4 to 80° C.

The quality improving agent of the present invention is prepared by mixing an enzyme having a saccharide transfer activity for converting an α-1,4-bond to an α-1,6-bond with another enzyme such as β-amylase, seasoning, a food additive, etc. The quality improving agent of the present invention may be in any of liquid, pasty, granular and powdery form. The amount of the enzyme having a saccharide transfer activity for converting an α-1,4-bond to an α-1,6-bond formulated in the quality improving agent is more than 0% and 100% or less.

The present invention is illustrated in detail below by way of Examples. However, the technical coverage of the present invention is not limited to the Examples.

EXAMPLES

Example 1

Measurement of the Properties by a Texture Analyzer

Commercially available rice (70 g) was washed with tap water and soaked in 100 ml of an enzyme solution containing an enzyme, 10 mM acetate buffer (pH 5.5) and Milli-Q water as shown in Table 1 for 2 hours at an ambient temperature followed by cooking. With regard to the enzyme, transglucosidase L (manufactured by Amano Enzyme; hereinafter, abbreviated as TGL) was used and, further, in order to compare with enzymes known to be added in the conventional improving method for cooking of rice, glucoamylase (manufactured by Amano Enzyme; hereinafter, abbreviated as GAF), α-amylase (manufactured by Wako Pure Chemical) and β-amylase (manufactured by Wako Pure Chemical) were added; thus, four kinds are in total. As a control, rice cooked without addition of an enzyme (NT) was also prepared.

With regard to the concentration of each enzyme, TGL was added in an amount of 0.05 ml (15,000 U) per gram of the raw rice used as a material while, as to GAF, α-amylase and β-amylase, 0.01 g, which is an optimum reacting amount of each enzyme, was added. In the case of α-amylase and β-amylase, groups to which 0.001 g corresponding to a one-tenth amount thereof, was added were also prepared and the study was conducted. Incidentally, the activity of the used TGL was 300,000 U/ml.

TABLE 1

| Formulation of Soaking Solution | | | | | | | |
|---|---|---|---|---|---|---|---|
| | Untreated (NT) | TGL | GAF | α-Amylase | α-Amylase | β-Amylase | β-Amylase |
| Enzyme Amount | — | 3.5 ml | 700 mg | 700 mg | 70 mg | 700 mg | 70 mg |
| Buffer (ml) | 5.5 | 2 | 5.5 | 5.5 | 5.5 | 5.5 | 5.5 |
| Milli-Q water (ml) | 94.5 | 94.5 | 94.5 | 94.5 | 94.5 | 94.5 | 94.5 |
| Total (ml) | 100 | 100 | 100 | 100 | 100 | 100 | 100 |

The cooked rice was divided into smaller portions and wrapped. The physical properties were measured after being allowed to cool down to an ambient temperature (0 hour) and after storing at 4° C. for 24 hours. For the measurement, a texture analyzer (which may be abbreviated as TA) (manufactured by Stable Micro Systems) where one grain of cooked rice was taken out from each sample, resistance by 90% compression with an acrylic column plunger of 1 cm diameter was measured and, from that value, the hardness and stickiness of the cooked rice were calculated. Further, for each sample, the measurement was done for ten grains and the mean value thereof was determined. The results are shown in FIGS. 1 and 2.

Figure 2:
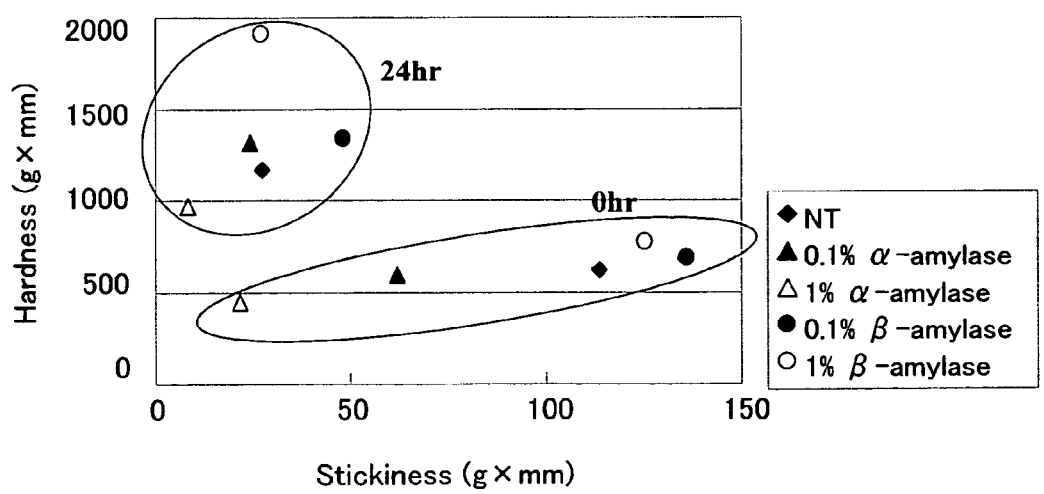
FIG. 2 shows the result of the TA measurement of the rice treated with α-amylase and with β-amylase (Example 1).

It is apparent from FIG. 1 that, immediately after being allowed to cool, the cooked rice showed softness and increased stickiness as the result of treatment with TGL and GAF as compared with the non-treated rice. After being stored at 4° C. for 24 hours, the rice treated with TGL kept its soft and sticky state but, in the case treated with GAF, such an effect was not obtained but, rather, the stickiness became less. Therefore, it was apparent that, when treated with TGL, a suppressive effect for retrogradation was noted while, when treated with GAF, such an effect was not achieved.

When treated with α-amylase, the cooked rice became softer but the stickiness significantly decreased. When the concentration of the enzyme was increased, such an effect became remarkable. Even after stored at 4° C. for 24 hours, nearly the same effect was noted and, although the product was soft as compared with the non-treated one, the stickiness was less. On the other hand, in the case of the treatment with β-amylase, although the stickiness became higher, an effect of increased hardness was noted and, in any of the cases, no complete effect of suppressing retrogradation was obtained. In addition, in the case of the treatment with α-amylase, although the product became softer, the rice itself crumbled to decay and the quality was bad. Incidentally, in the case of β-amylase, undesirable flavor was noted in the cooked rice and the quality was bad as well.

Example 2

Measurement of Gelatinization Degree by a β-amylase-pullulanase Method (BAP Method)

The same as in the case of Example 1, 70 g of commercially available rice was washed with tap water, 100 ml of an enzyme solution having the composition as shown in Table 2 was added and, after soaking was conducted at an ambient temperature for 2 hours, the rice was cooked. The activity of the TGL used was 300,000 U/ml. Ethanol was added to the cooked rice, and the rice was ground in a mortar and decanted. The same operation was repeated three times, the solvent was changed from ethanol to acetone, and the same operation was repeated three times more whereupon a completely dehydrated powdery sample was prepared. As to a sample for cooked rice, three kinds of cooked rice products—control (NT) which was not treated with any enzyme and TGL-treated and GAF-treated rice—were used (immediately after cooking, after storing at 4° C. for 5 hours and after storing at 4° C. for 24 hours).

TABLE 2

| Formulation of Soaking Solution | | | |
|---|---|---|---|
| | Non-treated (NT) | TGL | GAF |
| Amount of enzyme | — | 3.5 ml | 700 mg |
| Buffer (ml) | 5.5 | 2 | 5.5 |
| Milli-Q water (ml) | 94.5 | 94.5 | 94.5 |
| Total (ml) | 100 | 100 | 100 |

6.4 ml of Milli-Q water was added to 640 mg of the dehydrated powdery sample, followed by dispersing using a homogenizer. An alkali gelatinized sample was prepared from a part of the above (dissolved by an addition of 0.16 ml of 10N NaOH followed by adjusting to pH 6.0 by an addition of 0.6 ml of 12N acetic acid). While 1.6 ml each of the rest of them was collected as a suspension sample. After that, both of the suspension and the alkali gelatinized solution were adjusted to 20 ml using 0.8M acetate buffer. 4 ml of each was taken out therefrom into a Falcon tube, 1 ml of an enzyme solution (8 IU/ml of β-amylase and 7 IU/ml of pullulanase) was added, and the mixture was incubated at 40° C. for 30 minutes. At the same time, 4 ml was taken out from the suspension samples for a blank test and a group to which 1 ml of an inactivated enzyme solution was added was prepared. After the completion of the reaction, 1 ml was collected, heated at 100° C. for 5 minutes so that the enzyme was inactivated, diluted to an extent of 5-fold, 0.5 ml was taken out therefrom, the reducing ability (the amount of reducing sugar) was measured by a Somogyi-Nelson method, 0.5 ml was taken out similarly, the total saccharide amount was measured by a phenol sulfate method, and the degree of gelatinization was calculated by the following formula:

Degree of gelatinization=[(Decomposed rate of sample)/(Decomposed rate of completely gelatinized sample)]×100

Decomposed rate=[(Amount of resulted reducing sugar)/(Amount of total sugar)]×100

Figure 3:
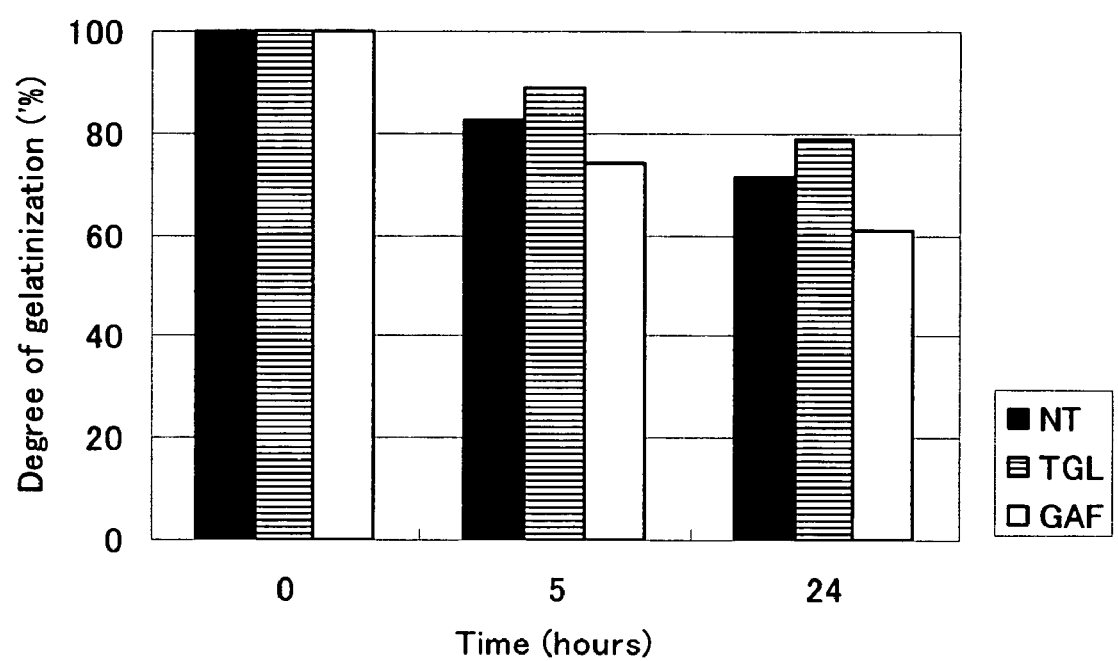
FIG. 3 shows the result of the measurement of the degree of gelatinization by the BAP method (Example 2).

The result is shown in FIG. 3.

From FIG. 3, as compared with NT (non-treated rice) where no enzyme was added, the degree of gelatinization was high and the effect of suppressing retrogradation was noted after 5 hour and 24 hours in the case of treatment with TGL.

On the other hand, in the case of treatment with GAF, the degree of gelatinization was rather low as compared with the non-treated rice and the result indicating promotion of retrogradation was obtained. This result was well coincided with the result of the TA measurement of FIG. 1.

Example 3

Sensory Evaluation

Commercially available rice (70 g) was washed with tap water, 100 ml of an enzyme solution having the formulation as shown in Table 3 was added and, after soaking at an ambient temperature for 2 hours and then was cooked. The activity of the TGL used was 300,000 U/ml. After cooking, the rice was kept for 15 minutes in the cooker and allowed to cool for 30 minutes down to the room temperature. The cooked rice which became to the room temperature was pushed into a mold (in a shape of straw bag of bale; a mouthful size), refrigerated at 4° C. and evaluated (0 hour and 24 hours). A sensory evaluation was conducted for appearance, aroma, taste, stickiness, hardness and overall (preference) at each time and a non-treated rice to which no enzyme was added was used as a control.

In the evaluation, Δ represents the case where the result was same as the non-treated rice; o represents a better result; oo represents a very good result; and x represents a bad result (stickiness: o for sticky sample; hardness: o for soft sample).

TABLE 3

| Formulation of Soaking solution | | | | | |
|---|---|---|---|---|---|
| | Untreated (NT) | TGL | GAF | α-Amylase | β-Amylase |
| Amount of enzyme | — | 3.5 ml | 700 mg | 70 mg | 70 mg |
| Buffer (ml) | 5.5 | 2 | 5.5 | 5.5 | 5.5 |
| Milli-Q water (ml) | 94.5 | 94.5 | 94.5 | 94.5 | 94.5 |
| Total (ml) | 100 | 100 | 100 | 100 | 100 |

The result of the sensory evaluation is shown in Table 4. Non-treated rice and TGL-treated rice were cooked and were refrigerated at 10° C. and a sensory evaluation was conducted with passage of time (after 0, 6, 24 and 48 hour(s)). The result is shown in Table 5.

TABLE 4

| Result of the evaluation for products refrigerated at 4° C. | | | | | | | | |
|---|---|---|---|---|---|---|---|---|
| | 0 hr | | | | 24 hr | | | |
| | TGL | GAF | α-Amylase | β-Amylase | TGL | GAF | α-Amylase | β-Amylase |
| Appearance | o | Δ | x | Δ | o | Δ | x | Δ |
| Aroma | Δ | x | x | Δ | Δ | x | x | Δ |
| Taste | Δ | Δ | x | x | Δ | Δ | x | x |
| Stickiness | o | Δ | x | ○ | oo | x | x | Δ |
| Hardness | Δ | o | oo | Δ | o | Δ | o | Δ |
| Total (Preference) | Δ | Δ | x | x | o | x | x | x |

TABLE 5

Result of the sensory evaluation for products refrigerated at 10° C.

|  | 0 hr | 6 hr | 24 hr | 48 hr |
|---|---|---|---|---|
| Appearance | ○ | ○ | ○ | ○ |
| Aroma | Δ | Δ | Δ | Δ |
| Taste | Δ | Δ | Δ | ○ |
| Stickiness | ○ | ○○ | ○○ | ○○ |
| Hardness | Δ | ○ | ○ | ○ |
| Total (Preference) | Δ | ○ | ○ | ○○ |

It is apparent from Table 4 that, in the case of the treatment with TGL, cooked rice had sticky and soft properties and that the result was more markedly in the sample of after 24 hours. As compared with the control, the result was so good that, in the appearance, grains were in good shape and plump. The taste was the same as or even better than the control. On the contrary, in the case of the treatment with GAF, the rice immediately after cooking was soft as compared with the control but, after 24 hours, there was no difference from the control and stickiness was inferior to the control. In the treatment with a-amylase, the cooked rice was soft but the stickiness significantly decreased. When the enzyme concentration was higher, the effect was more significant. Even after being stored for 24 hours, the effect was nearly the same and, although the product was softer than the untreated rice, the stickiness was less. Further, immediately after cooking in the case of treating with β-amylase, it became stickier but the hardness hardly changed (although there was no significant difference, some hardness was noted). Moreover, after 24 hours, such an effect was not noted at all and the texture was not different from that of the control. The softness in the case of being treated with α-amylase was due to crumbling of the rice per se to decay whereby the appearance was bad, sweetness was too strong and the taste was not favorable. In the case of β-amylase, undesirable flavor in the cooked rice was noted and the taste was bad.

It was noted from Table 5 that, at anytime after cooking, the rice treated with TGL was sticky and soft. When the period of the refrigeration storage becomes longer, the difference became more markedly and the effect of suppressing retrogradation became more markedly as well.

Example 4

Added use of β-amylase

Commercially available rice (150 g) was washed with distilled water, an enzyme was added thereto in the amount as shown in Table 6 (in terms of enzymatic activity per gram of the raw rice), tap water was added thereto in an amount of 1.4-fold of the raw rice and, after soaking at room temperature for 1 hour, the rice was cooked using a commercially available rice cooker ("National" SR-03G). Enzymes used were Amylase AD "Amano 1"(manufactured by Amano Enzyme) as α-amylase, Biozyme ML (manufactured by Amano Enzyme) as β-amylase and Transglucosidase L (manufactured by Amano Enzyme; hereinafter, abbreviated as TGL) as glycosyltransferase. After cooking, the rice was kept for 15 minutes in the cooker and a sensory evaluation was carried out. After that, the rice was kept at about 70° C. in the cooker and, after 2 hours, a sensory evaluation was conducted.

In the evaluating method, Δ represents the case where the sample was the same as the non-treated rice; o represents a better result; oo represents a very good result; and x represents a bad result. The result of the sensory evaluation is shown in Table 7.

TABLE 6

Added amount of enzyme

|  | α-Amylase (u/g raw rice) | β-Amylase (u/g raw rice) | TGL (u/g raw rice) |
|---|---|---|---|
| 1 | 0.05 | — | — |
| 2 | — | 0.0325 | — |
| 3 | — | — | 75 |
| 4 | — | — | 750 |
| 5 | — | — | 3000 |
| 6 | — | — | 7500 |
| 7 | 0.05 | — | 75 |
| 8 | — | 0.0325 | 75 |

TABLE 7

Sensory evaluation

|  | Name of Enzyme | Immediately after Cooking | | | | Two Hours after Cooking | | | |
|---|---|---|---|---|---|---|---|---|---|
|  |  | Taste | Hardness | Stickiness | Grain Feeling | Taste | Hardness | Stickiness | Grain Feeling |
| 1 | α-Amylase | x | x | x | x | x | x | x | x |
| 2 | β-Amylase | Δ | ○ | Δ | Δ | Δ | Δ | Δ | Δ |
| 3 | TGL (75 u/g raw rice) | ○ | ○ | ○ | ○ | ○ | ○ | ○ | ○ |
| 4 | TGL (750 u/g raw rice) | ○ | ○ | ○ | ○ | ○ | ○ | ○ | ○ |
| 5 | TGL (3000 u/g raw rice) | ○ | ○○ | ○○ | ○ | ○ | ○ | ○ | ○ |
| 6 | TGL (7500 u/g raw rice) | ○ | ○○ | ○○ | ○ | ○ | ○ | ○ | ○ |
| 7 | TGL (75 u/g raw rice) + α-Amylase | Δ | ○ | Δ | Δ | Δ | Δ | x | x |
| 8 | TGL (75 u/g raw rice) + β-Amylase | ○○ | ○○ | ○○ | ○○ | ○○ | ○○ | ○○ | ○○ |

When only α-amylase was added, the result was in such a state that the outer area of the rice was melted while, in the central area, the cores remained uncooked and the taste, hardness and grain feeling (meaning good shape and elastic texture) were not favorable. Sweet taste was particularly strong and that was felt to be unnatural. Stickiness was not noted as well. In the case of the addition of β-amylase, the cooked rice was somewhat soft giving plump feel but it was too soft and grain feeling was hardly noted. In the case where only glycosyltransferase (TGL) was added, although the inner area was somewhat soft, the surface was tough giving a strong grain feel. The sweet taste was somewhat strong. The surface was moisturized and showed favorable stickiness. When the adding amount was more, such effects were noted more significantly. When glycosyltransferase (TGL) and β-amylase were added together, the same favorable degree of hardness and stickiness was noted as compared with the case where only glycosyltransferase (TGL) was added to an extent of 100-fold thereof (7,500 u/g) although, after being allowed to stand for 2 hours, the result in hardness and stickiness were more favorable. Thus, although the surface was tough, the inner area was soft giving a favorable sticky texture where plumper feel was noted than in the case of TGL only. In terms of the taste, natural sweet taste was noted resulting in very favorable feel. Accordingly, when glycosyltransferase (TGL) and β-amylase were used together, the same or even better effect was able to be achieved by the addition in an amount of TGL at 1/100 of the amount of the case that the glycosyltransferase (TGL) was used solely. On the contrary, when TGL and α-amylase were used together, improvement of the taste and texture was little and, after storage, no effect for improvement of the taste and texture was noted.

Example 5

Effect of Addition to French Bread

The materials as shown in Table 8 were mixed for 7 minutes at the low speed and for 30 seconds at the high speed using a mixer (Upright mixer AM-20 manufactured by Aikosha Seisakusho), subjected to the first fermentation for 120 minutes, then subjected to the second fermentation at 30° C. and 80% humidity for 60 minutes and divided into 350 g each. After a bench time at the room temperature for 30 minutes, it was made into a predetermined shape, proofed (at 30° C. and 80% humidity for 70 minutes) and baked in an oven (upper surface: 240° C.; lower surface: 230° C.) whereupon French bread was manufactured. Transglucosidase L (manufactured by Amano Enzyme; hereinafter, abbreviated as TGL) was used as a glycosyltransferase. The activity of the TGL used was 300,000 U/g and the adding amount of TGL per gram of wheat flour used as a material was 1,500 U. The manufactured bread was evaluated immediately after baking, after 2 hours from baking (being allowed to cool down to room temperature) and after freezing and thawing at the room temperature. The result of the evaluation is shown in Table 9. The case where no enzyme was added was used as a control. As a result of the addition of TGL, the inner phase of the bread showed much elasticity and changed to an elastic texture. A moisturized texture was noted as well. Even when it was quickly frozen at −80° C. and subjected to thawing at the room temperature after being stored for two days, the same tendency was noted whereupon it was noted that retrogradation of the bread was suppressed and a good texture was maintained.

TABLE 8

Formulation of French Bread

| Formulation | Control | +TGL |
| --- | --- | --- |
| Wheat flour | 1000 | 1000 |
| Dry yeast | 7 | 7 |
| Salt | 20 | 20 |
| Vitamin C | 0.01 | 0.01 |
| Malt extract | 3 | 3 |
| Water | 680 | 675 |
| Enzyme (TGL) | 0 | 5 |

(unit: gram(s))

TABLE 9

Result of Sensory Evaluation of French Bread

| After Baking (numbers of panelists(n) = 3) | Elasticity of Inner Phase | Softness of Inner Phase | Density of Inner Phase | Moisture in Inner Phase (Moisture Feel) | Appearance | Overall | Comments |
| --- | --- | --- | --- | --- | --- | --- | --- |
| Control (no enzyme added) | Δ | Δ | Δ | Δ | Δ | Δ | |
| TGL was added | ⊙⊙ | Δ | ◯ | ○ | Δ | ○ | * |

*: Inner phase was flexible and elastic (3/3)
Inner phase was solid and highly dense (3/3)
Inner phase was moisturized (3/3)
Outer side was hard and had crunchy feel (2/3)

| After Being Allowed to Cool (numbers of panelist (n) = 9) | Elasticity of Inner Phase | Softness of Inner Phase | Density of Inner Phase | Moisture in Inner Phase (Moisture Feel) | Appearance | Overall | Comments |
| --- | --- | --- | --- | --- | --- | --- | --- |
| Control (no enzyme added) | Δ | Δ | Δ | Δ | Δ | Δ | |
| TGL was added | ⊙⊙ | Δ~○ | ○ | ○ | Δ | ○ | * |

*: Inner phase was flexible and elastic (9/9)
Inner phase was solid and highly dense (9/9)
Inner phase was moisturized (9/9)

| After Thawing at Room Temp. (numbers of panelists (n) = 9) | Elasticity of Inner Phase | Softness of Inner Phase | Density of Inner Phase | Moisture in Inner Phase (Moisture Feel) | Appearance | Overall | Comments |
|---|---|---|---|---|---|---|---|
| Control (no enzyme added) | x | x | x | x | Δ | x | ** |
| TGL was added | oo | o | ◯ | o | Δ | o | * |

\*\*: Inner phase was loose and dry (9/9)
\*: Inner phase was flexible and elastic (9/9)
Inner phase was solid and highly dense (9/9)
Inner phase was moisturized (9/9)
x: bad (not elastic, hard, lowly dense and dry)
Δ: average
o: good (elastic, soft, highly dense and moisturized)
oo: very good
(a/b) in the comments: "a" for numbers of the panelists with the comments as such while "b" for total numbers of panelists

Example 6

Effect of Addition to English Bread

The sponge dough materials as shown in Table 10 were mixed at the low speed revolution for 4 minutes and at the medium speed revolution for 4 minutes using a mixer (Upright mixer AM-20 manufactured by Aikosha Seisakusho), fermented at 30° C. and 85% humidity for 3 hours (floor time) and then divided into eight portions. The main kneading materials as shown in Table 10 were mixed at the low speed revolution for 2 minutes and the sponge dough divided into eight was added, mixed at the low and the medium speed for 2 minutes each. Then shortening was added and the mixture was subjected to mixing at the low, the medium and the high speed revolutions for 3, 2 and 2 minutes, respectively. After a floor time of 15 minutes, the mixture was divided into 210 g each and made round and, after a bench time of 15 minutes, it was made into a predetermined shape, dried (at 38° C. and 85% humidity for 60 minutes) and baked (at 160° C. on the upper surface while at 240° C. on the lower surface) to prepare English bread. Transglucosidase L (manufactured by Amano Enzyme; hereinafter, abbreviated as TGL) was used as a glycosyltransferase. The activity of the TGL used as 300,000 U/g and the amount of TGL added per gram of the wheat flour of raw materials was 2,143 U. The resulting bread was evaluated immediately after baking, after 2 hours after baking (being allowed to cool down to room temperature) and after stored under refrigeration at 4° C. for 3 days. The result of the evaluation is shown in Table 11. The sample where no enzyme was added was used as a control, and the evaluation was carried out for the group where α-amylase (a reagent manufactured by Sigma) frequently used as an enzyme preparation for the prevention of retrogradation of bread (no TGL added) and for the group to which TGL was added. As the same as in Example 5, the inner area of the bread was highly elastic and sticky being with moisturized texture in the TGL-added group. Even after being stored under refrigeration where retrogradation is apt to proceed, the same tendency was noted and retrogradation was suppressed and favorable texture was maintained. On the other hand, in the group to which α-amylase was added, although the product was soft, neither elastic nor moisturized texture was obtained. After being stored under refrigeration, nearly the same hardness as in the control was noted and no suppressive action to retrogradation was achieved. In addition, the shape of the baked bread showed poor volume and became distorted.

TABLE 10

| Formulation of English Bread | | | | |
|---|---|---|---|---|
| Compound | | Control | +TGL | +α-Amylase |
| Sponge Dough | Wheat flour | 700 | 700 | 700 |
| | Yeast | 20 | 20 | 20 |
| | Yeast food | 1 | 1 | 1 |
| | Water | 360 | 355 | 359.975 |
| | Enzyme | 0 | 5 | 0.025 |
| Main Kneading | Wheat flour | 300 | 300 | 300 |
| | Salt | 18 | 18 | 18 |
| | Sugar | 50 | 50 | 50 |
| | Water | 200 | 200 | 200 |

(unit: gram(s))

TABLE 11

| Result of Sensory Evaluation of English Bread | | | | | | | |
|---|---|---|---|---|---|---|---|
| After Baking (numbers of panelists (n) = 3) | Elasticity of Inner Phase | Softness of Inner Phase | Density of Inner Phase | Moisture in Inner Phase (Moisture Feel) | Appearance | Overall | Comments |
| Control (no enzyme added) | Δ | Δ | Δ | Δ | Δ | Δ | |
| TGL was added | oo | Δ | ◯ | o | Δ | o | * |
| E5 was added | x | o | Δ | Δ | x | Δ | ** |

\*: Inner phase was flexible and elastic (3/3)
Inner phase was solid and highly dense (3/3)
Inner phase was moisturized (2/3)
Outer side (crust) had crunchy feel (2/3)
\*\*: Inner phase was soft (3/3)
Volume was poor (3/3)
Sweet taste was strong (2/3)

| After Being allowed to cool (numbers panelists (n) = 7) | Elasticity of Inner Phase | Softness of Inner Phase | Density of Inner Phase | Moisture in Inner Phase (Moisture Feel) | Appearance | Overall | Comments |
|---|---|---|---|---|---|---|---|
| Control (no enzyme added) | Δ | Δ | Δ | Δ | Δ | Δ | |
| TGL was added | ○○ | Δ~○ | ◯ | ○ | Δ | ○ | *** |
| E5 was added | x | ○ | Δ | Δ | x | Δ | **** |

\*\*\*: Inner phase was flexible and elastic (7/7)
Inner phase was solid and highly dense (7/7)
Inner phase was moisturized (7/7)
\*\*\*\*: Inner phase was not elastic (7/7)
Inner phase was soft (7/7)
Shape of the bread was distorted (7/7)

| After Stored with Refrigeration (numbers of panelists (n) = 4) | Elasticity of Inner Phase | Softness of Inner Phase | Density of Inner Phase | Moisture in Inner Phase (Moisture Feel) | Appearance | Overall | Comments |
|---|---|---|---|---|---|---|---|
| Control (no enzyme added) | x | x | x | x | x | x | |
| TGL was added | ○○ | ○ | ◯ | ○ | ◯ | ○ | *** |
| E5 was added | x | Δ | x | xx | xx | x~Δ | **** |

\*\*\*: Inner phase was flexible and elastic (4/4)
Inner phase was solid and highly dense (4/4)
Inner phase was moisturized (4/5)
\*\*\*\*: Inner phase was not elastic (4/4)
Inner phase was soft (2/4)
Shape of the bread was distorted (4/4)
xx: very bad
x: bad (not elastic, hard, lowly dense and dry)
Δ: average
○: good (elastic, soft, highly dense and moisturized)
○○: very good
(a/b) in the comments: "a" for numbers of the persons with the comments as such while "b" for numbers of evaluating persons

Example 7

Effect of Addition to Udon

Transglucosidase L (manufactured by Amano Enzyme; hereinafter abbreviated as TGL) was dissolved as a glycosyltransferase in a saline solution of 20° C. where 30 g of salt was added to 400 g of tap water. The enzyme-containing saline solution was added to a medium strength flour, and mixed by hand for 3 minutes. Then the mixture was mixed by a machine (TVM 03-0028 manufactured by Tomen Corporation) for 10 minutes (at 95 rpm for 4 minutes and at 75 rpm for 6 minutes), roughly stirred, compounded, compressed, kept for 1 hour, cut into noodle lines, and frozen at −40° C. to give frozen udon (Japanese noodles). The activity of the TGL used was 300,000 U/g and the amount of the TGL added per gram of the wheat flour of raw materials was 1,500 U.

Udon which was manufactured by the same method, except that no enzyme was added, was used as a control. In a sensory evaluation, hardness, elasticity, stickiness and central feeling (meaning that the core of noodle is harder than its outer) were evaluated where the control was used as a standard (sensory score: 3) (in the sensory score, the lowest one was point 0 while the highest one was point 5). The evaluation was carried out immediately after boiling and after being allowed to stand for 1 hour at the room temperature after boiling. The result is shown in Table 12. Immediately after boiling, the udon which was treated with TGL had elasticity, hard (solid), some increased stickiness and improved texture as compared with the control. After being allowed to stand for 1 hour, the above-mentioned characteristics were maintained and central feel was also noted.

TABLE 12

Result of Evaluation of Udon

| | Immediately after Boiling | | | | After One Hour from Boiling | | | |
|---|---|---|---|---|---|---|---|---|
| | Hardness | Elasticity | Stickiness | Central Feeling | Hardness | Elasticity | Stickiness | Central Feeling |
| Control | Δ | Δ | Δ | Δ | Δ | Δ | Δ | Δ |
| +TGL | ○ | ○ | Δ~○ | Δ | ○ | ○ | Δ~○ | ○ |

Δ: average
○: good (hard, elastic, sticky and having central feeling)

Example 8

Figure 4:
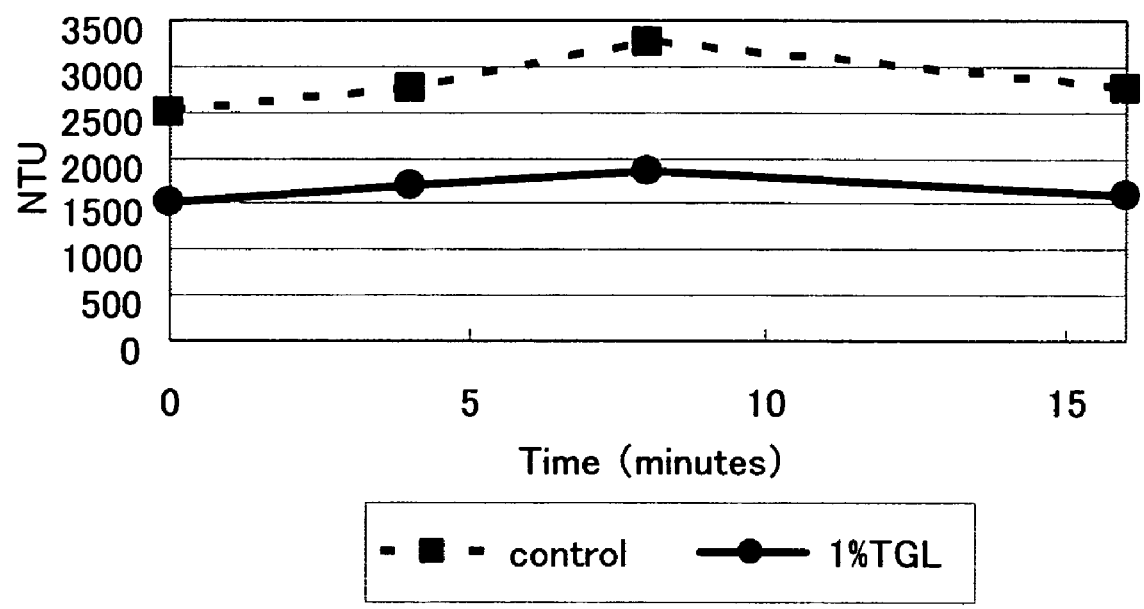
FIG. 4 shows the result of the measurement of the turbidity of rice noodles (Example 8).

Effect of Addition to Rice Noodles 2 parts by weight of rice was washed, soaked for 3.5 hours in 3 parts by weight of tap water and ground by a grinding machine to prepare a rice milky liquid. 6 parts by weight of the rice milky liquid were mixed with 3 parts by weight of corn starch and 1 part by weight of tapioca starch, 1% to the weight of the rice flour of Transglucosidase L (manufactured by Amano Enzyme; hereinafter abbreviated as TGL) was added thereto as a glycosyltransferase and the mixture was allowed to stand at 24° C. for 30 minutes. The mixture was applied onto a tray to be 0.65 to 0.75 mm of thickness and steamed at 100° C. for 2 minutes. Then, the mixture was subjected to a primary drying at 45° C. for 45 minutes, retrograded at 25° C. for 3.5 hours, made into noodle lines using a pasta-manufacturing machine, then formed into blocks and subjected to secondary drying at 45° C. for 2.5 hours to prepare rice noodles. The activity of TGL was 300,000 U/ml and the amount of TGL added to 1 g of the material powder for noodles (a mixture of rice, corn starch and tapioca starch) was 1,800 U. The resulting rice noodles were placed in hot water and turbidity of the water was measured (using a Lamotte portable turbidity meter 2020). The result is shown in FIG. 4. It is noted that the rice noodles treated with TGL were with a low turbidity and that the elution of the starch into water was suppressed.

Example 9

Effect of Addition to Potato Salad

Figure 6:
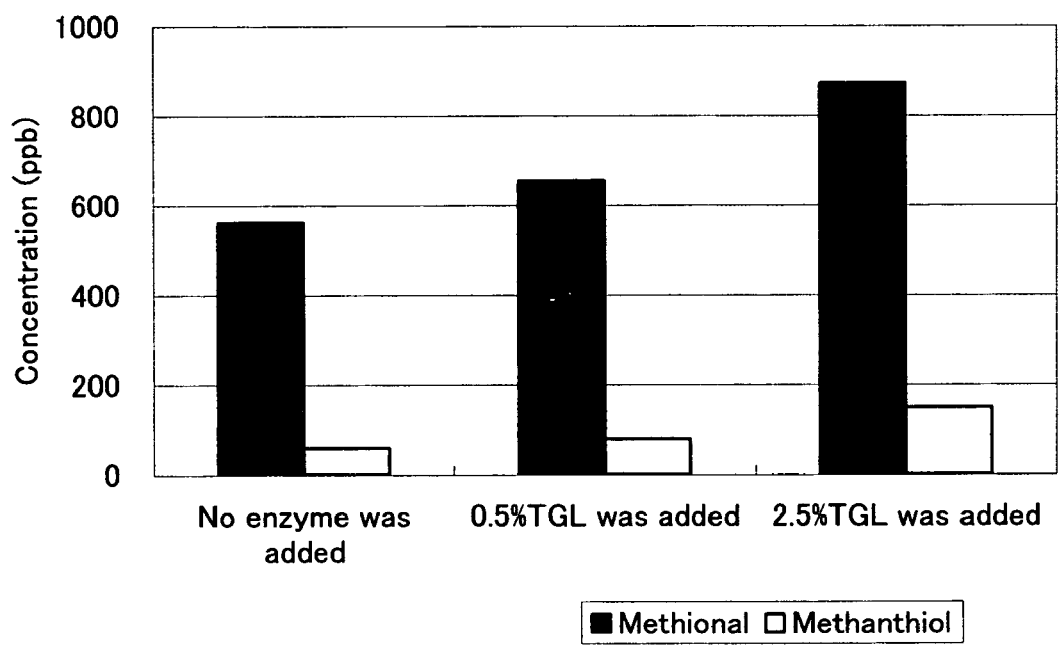
FIG. 6 shows the result of the smell analysis of the potato salad of the process A by gas chromatography (Example 9).

Potato salad was manufactured according to the formulation of Table 13 and the manufacture method of FIG. 5. Transglucosidase L (manufactured by Amano Enzyme; hereinafter abbreviated as TGL) was used as a glycosyltransferase. Incidentally, the activity of the TGL used was 300,000 U/ml and introduction of the enzyme was carried out by soaking the potato material into the same amount of enzyme solutions (0.5 and 2.5% solutions). The concentrations of TGL in the solution per gram of the fresh potato material were 1,500 U and 7,500 U. In the step A, no cooling step was conducted before mixing with mayonnaise and the potato was made into a mashed state. In the step B, cooling was conducted before mixing and the mixture was softly dressed so as to remain the shape of the potato. The result of a sensory evaluation immediately after the manufacture is shown in Table 14. Storage under refrigeration (at 4° C.) was also conducted for two weeks and evaluation on the appearance was conducted by naked eye, the smell was analyzed and the hardness of the potato in the potato salad manufactured in the step B was measured by a texture analyzer. The analytic result for the smell is shown in FIG. 6 while the measured result for the hardness is shown in FIG. 7.

From the result of the sensory evaluation immediately after the manufacture, it is noted that, in the potato salad manufactured and prepared by any of the steps A and B, as the result of addition of TGL, the potato became moisturized and a big change was resulted in the texture. Such an effect was significant particularly in the step B. In the potato salad after storing under refrigeration for two weeks, oil of mayonnaise was separated in the product without the enzyme and the color of the potato salad itself was also yellowish (presumed to be the color of oil). On the contrary, the separation of oil did not take place in the product to which TGL was added whereby it is apparent that addition of TGL suppresses the separation of oil. That is presumably because changes in potato starch took place by the addition of TGL whereby the stability of the emulsion of mayonnaise was improved.

Figure 7:
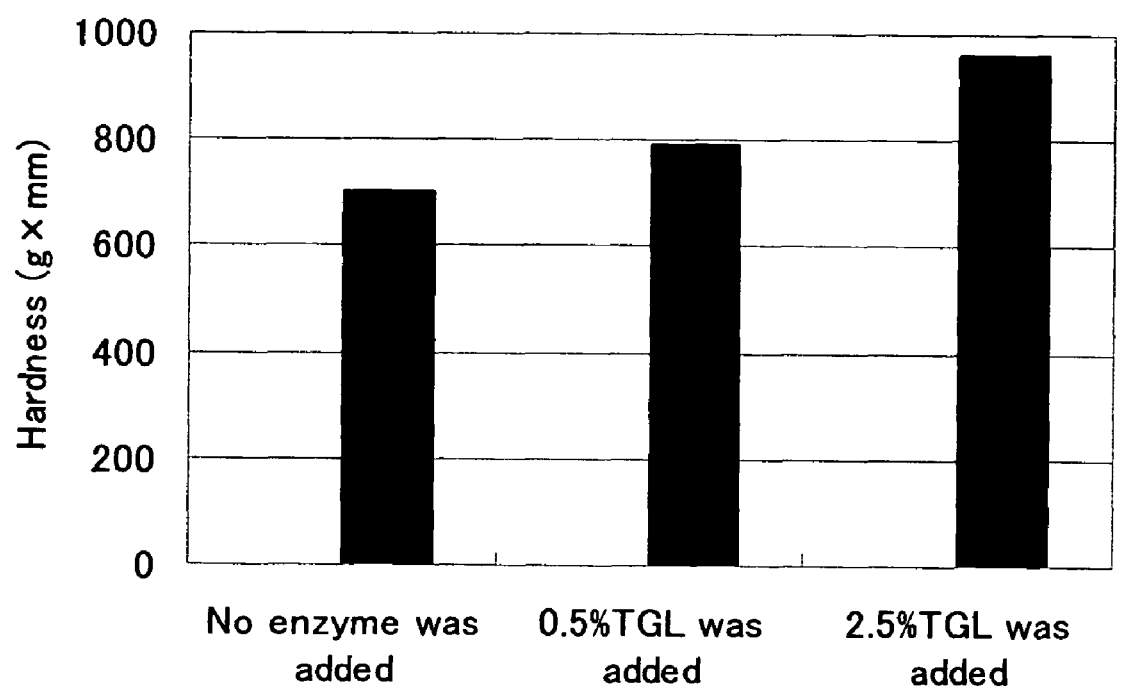
FIG. 7 shows the result of the measurement of TA of the potato in the potato salad of the process B (Example 9).

It is shown from FIG. 7 that, when TGL was added, methional and methanethiol which are the to be the components for the flavor of potato were in high concentrations and that, even when time elapses after the manufacture, the potato flavor was still maintained. In addition, there was a tendency that, the more the adding amount was, the higher the smell concentration was.

From FIG. 8, it is noted that the potato to which no enzyme was added was soft and showed a deteriorated texture while, in the potato to which TGL was added, no softening was resulted and the texture was maintained even when time had passed after the manufacture.

TABLE 13

Formulation of Potato Salad

|  | Step A (g) | Step B (g) |
|---|---|---|
| Potato | 330 | 270 |
| Mayonnaise | 82 | 67 |
| Carrot | — | — |
| Onion | — | — |
| 7% NaCl Solution | 12 | 10 |

TABLE 14

Result of Sensory Evaluation of Potato Salad

|  | Appearance | Texture, Taste |
|---|---|---|
| | In the Step A | |
| No Enzyme Added | Much separation of oil Color was yellowish | Oil was separated and very sticky Oil was abundant and no good feel |
| 0.5% TGL Added | Separation of oil was hardly noted Color was whity (due to potato itself) | Moisturized as compared with no addition of the enzyme and the oil was without uneasy feeling |
| 2.5% TGL Added | Separation of oil was hardly noted (though a bit more than "0.5% addition") Color was whity (due to potato itself) | Moisturized as compared with no addition of the enzyme and the oil was without uneasy feeling |

TABLE 14-continued

Result of Sensory Evaluation of Potato Salad

| | Appearance | Texture, Taste |
|---|---|---|
| | In the Step B | |
| No Enzyme Added | The same as in the ordinary potato salad | Oil was separated and very sticky Oil was abundant and no good feel |
| 0.5% TGL Added | The same as in the ordinary potato salad No particular difference from the sample of no enzyme in terms of the appearance | Fresh and moisturized as compared with no addition of the enzyme Potato was in uniform texture as a whole |
| 2.5% TGL Added | The same as in the ordinary potato salad No particular difference from the sample of no enzyme in terms of the appearance | Fresh and moisturized as compared with no addition of the enzyme Potato was in uniform texture as a whole (outer and inner areas were in the same texture) |

In accordance with the present invention, as exemplified above, retrogradation of a starch-containing food is suppressed, the quality thereof is improved, and such a state is maintained for a long period of time. The present invention is utilized for maintenance of the quality of a cooked rice food and a processed wheat flour food. Such food products are kept for some time after cooking until eating, particularly in the case of box lunches sold in convenience stores, whereby the present invention is quite advantageous in the field of foods, and particularly in the field of manufacture and sale of take-out food such as lunch box and in the field of food service industry.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method for producing a starch-containing food, wherein said starch-containing food is cooked rice, a noodle, a bread, or potato salad,
   wherein when said food is cooked rice, said method comprising:
      contacting raw rice with a transglucosidase (EC 3.2.1.20) and, optionally a β-amylase, to obtain a mixture comprising said transglucosidase and said raw rice; and
      cooking said mixture, to obtain said cooked rice;
   wherein when said food is a noodle, said method comprising:
      adding a transglucosidase (EC 3.2.1.20) and, optionally a β-amylase, to a noodle dough, to obtain an enzyme-treated noodle dough; and
      forming a noodle from such enzyme-treated noodle dough;
   wherein when said food is a bread, said method comprising:
      adding a transglucosidase (EC 3.2.1.20) and, optionally a β-amylase, to a bread dough, to obtain an enzyme-treated bread dough; and
      baking said bread dough, to obtain said bread; and
   wherein when said food is potato salad, said method comprising:
      adding a transglucosidase (EC 3.2.1.20) and, optionally a β-amylase, to potato salad, to obtain an enzyme-treated potato salad,
   provided said noodle or bread is not treated with α-amylase.

2. The method according to claim 1, wherein said cooked rice is selected from the group consisting of cooked rice, red-colored cooked rice, pilaf, rice cooked with other ingredients, porridge, risotto, rice ball, sushi, boxed lunch, rice noodles, processed glutinous rice, and combinations thereof.

3. The method according to claim 1, wherein said noodle is selected from the group consisting of noodles, Chinese noodles, lasagna, macaroni, and combinations thereof.

4. A method for producing cooked rice, said method comprising:
   adding to raw rice 15 to 30,000 U of transglucosidase per gram of the raw rice and, optionally, a β-amylase, to obtain a mixture comprising said transglucosidase and said raw rice; and
   cooking said mixture to obtain cooked rice.

5. A method for producing cooked rice, said method comprising:
   adding to raw rice 3 to 30,000 U of transglucosidase per gram of the raw rice and 0.00065 to 0.65 U of β-amylase per gram of the raw rice, to obtain a mixture comprising said transglucosidase, said β-amylase, and said raw rice; and
   cooking said mixture to obtain cooked rice.

6. A method for producing bread, said method comprising:
   adding to wheat flour 1.5 to 150,000 U of transglucosidase per gram of the wheat flour and, optionally, a β-amylase, to obtain an enzyme-treated wheat flour,
   mixing said enzyme treated wheat flour in a mixture for bread; and
   baking the mixture to form the bread,
   provided said wheat flour is not treated with α-amylase.

7. A method for producing a noodle, said method comprising:
   adding to a raw material flour 1.5 to 150,000 U of transglucosidase per gram of the raw material flour and, optionally, a β-amylase, to obtain an enzyme-treated raw material flour;
   mixing the raw material flour in a mixture for a noodle; and
   forming said noodle,
   provided said raw flour material is not treated with α-amylase.

8. A method for producing potato salad, said method comprising:
   adding to at least one potato 1.5 to 150,000 U of transglucosidase per gram of the potato and, optionally, a β-amylase, to obtain an enzyme-treated potato; and
   adding said enzyme-treated potato to a salad mixture.

9. A method according to claim 1, wherein said starch-containing food is cooked rice, and said method comprises:
   contacting raw rice with a transglucosidase (EC 3.2.1.20) and, optionally a β-amylase, to obtain a mixture comprising said transglucosidase and said raw rice; and
   cooking said mixture, to obtain said cooked rice.

10. A method according to claim 9, in which said rice is contacted with a β-amylase.

11. A method according to claim 1, wherein said starch-containing food is a noodle, and said method comprises:
   adding a transglucosidase (EC 3.2.1.20) and, optionally a β-amylase, to a noodle dough, to obtain an enzyme-treated noodle dough; and
   forming a noodle from such enzyme-treated noodle dough, provided said noodle dough is not treated with α-amylase.

12. A method according to claim 11, in which a β-amylase is added to said noodle dough.

13. A method according to claim 1, wherein said starch-containing food is a bread, and said method comprises:
   adding a transglucosidase (EC 3.2.1.20) and, optionally a β-amylase, to a bread dough, to obtain an enzyme-treated bread dough; and
   baking said bread dough, to obtain said bread,
   provided said bread dough is not treated with α-amylase.

14. A method according to claim 13, in which a β-amylase is added to said bread dough.

15. A method according to claim 1, wherein said starch-containing food is potato salad, and said method comprises:
   adding a transglucosidase (EC 3.2.1.20) and, optionally a β-amylase, to potato salad, to obtain an enzyme-treated potato salad.

16. A method according to claim 15, in which a β-amylase is added to said potato salad.

17. A method for preparing improved cooked rice, comprising:
   (a) cooking raw rice, to obtain cooked rice; and
   (b) contacting said cooked rice with a transglucosidase (EC 3.2.1.20) and, optionally a β-amylase, to obtain said improved cooked rice.

18. A method according to claim 17, wherein said cooked rice with is contacted with a β-amylase.

19. A method according to claim 17, wherein said raw rice is contacted with 3 to 30,000 U of said transglucosidase per gram of said raw rice.

20. A method according to claim 18, wherein said raw rice is contacted with 0.00065 to 0.65 U of said β-amylase per gram of said raw rice.

21. A method according to claim 18, wherein said raw rice is contacted with 3 to 30,000 U of said transglucosidase per gram of said raw rice and with 0.00065 to 0.65 U of said β-amylase per gram of said raw rice.

* * * * *